United States Patent [19]
Wolf

[11] Patent Number: 5,503,116
[45] Date of Patent: Apr. 2, 1996

[54] ARRANGEMENT FOR SUPPLYING LIQUIDS TO A PISTON

[75] Inventor: Harry Wolf, Uhingen, Germany

[73] Assignee: Mercedes-Benz AG, Stuttgart, Germany

[21] Appl. No.: 359,041

[22] Filed: Dec. 19, 1994

[30] Foreign Application Priority Data

Dec. 23, 1993 [DE] Germany ............ 43 44 078.9

[51] Int. Cl.$^6$ ........................................ F01P 1/04
[52] U.S. Cl. ............................ 123/41.35; 123/196 R
[58] Field of Search ................ 123/41.35, 196 R

[56] References Cited

U.S. PATENT DOCUMENTS

| | | | |
|---|---|---|---|
| 2,991,770 | 7/1961 | Rausch | 123/41.35 |
| 3,958,541 | 5/1976 | Lachnit | 123/196 R |

FOREIGN PATENT DOCUMENTS

| | | |
|---|---|---|
| 0347580 | 12/1989 | European Pat. Off. |
| 2388990 | 12/1978 | France ............ 123/41.35 |
| 624528 | 1/1936 | Germany. |
| 2428451 | 1/1976 | Germany. |
| 2524272 | 12/1976 | Germany. |
| 3125835 | 1/1983 | Germany. |
| 3416076 | 1/1985 | Germany. |
| 3546646 | 3/1985 | Germany. |
| 3508405 | 10/1985 | Germany. |
| 3910794 | 10/1990 | Germany. |

*Primary Examiner*—Noah P. Kamen
*Attorney, Agent, or Firm*—Klaus J. Bach

[57] ABSTRACT

In an arrangement for supplying cooling oil to the piston of an internal combustion engine which has intake and exhaust valve drive and also fuel injection pump drive components, a pipe is mounted on the engine housing in communication with a cooling oil supply passage and has a free end extending under the piston for spraying cooling oil to the underside of the piston, at least one additional discharge opening is provided on the pipe which is directed toward the intake and exhaust valve drive components and the fuel injection pump drive components.

6 Claims, 2 Drawing Sheets

ARRANGEMENT FOR SUPPLYING LIQUIDS TO A PISTON

BACKGROUND OF THE INVENTION

The invention relates to an arrangement for directing a liquid to a piston of an internal combustion engine.

DE-A-3125835 discloses an arrangement for directing a lubricating coolant to a piston of an internal combustion engine. The coolant is directed from a pipe with an end nozzle to the underside of the piston.

DE-A-3910794 discloses an internal combustion engine with a cam shaft supported in the cylinder housing. The cam shaft operates the engine intake and exhaust valves and also the injection pump, which has pump lifters to which lubricant is supplied via a lubricant supply passage. The cam shaft cams are generally lubricated by oil mist present in the area. However, because of the high surface pressures on the pump cams, the oil spray normally present in the cam shaft area is insufficient. An additional oil supply is therefore desirable for the drive components referred to above. Such oil supply can be provided by passages extending through the cylinder housing as shown in DE-A-3910794. It is also possible to provide separate oil supply lines with discharge nozzles specifically installed therefor as disclosed in DE-A-2524272.

It is the object of the present invention to improve the arrangement for supplying coolant to a piston in such a manner that it also provides for lubrication of moving drive components.

SUMMARY OF THE INVENTION

In an arrangement for supplying cooling oil to the piston of an internal combustion engine which has intake and exhaust valve drive and also fuel injection pump drive components, a pipe is mounted on the engine housing in communication with a cooling oil supply passage. The pipe has a free end extending under the piston for spraying cooling oil to the underside of the piston. At least one additional discharge nozzle is provided on the pipe, which is directed toward the intake and exhaust valve drive components and the fuel injection pump drive components for lubricating those components.

With the additional discharge nozzle or nozzles, not only cooling of the pistons is achieved, but, at the same time, lubricant is supplied to drive components for the operation of the intake and exhaust valves and the drive components for the fuel supply pump.

The advantages achieved by the arrangement according to the invention are, therefore, seen in the fact that a single pipe provides for lubrication and cooling of the piston and also, of particular drive components. Furthermore, separate lubrication of these drive components is no longer necessary which results in a simplification of the internal combustion engine. Appropriate lubrication is achieved in a simple manner and very economically by only providing, on the side of a regular lubricant supply pipe, nozzle openings which are easily formed by drilling holes into the lubricant supply pipe.

The invention is disclosed in greater detail below on the basis of the accompanying drawings.

DESCRIPTION OF A PREFERRED EMBODIMENT

Figure 1:
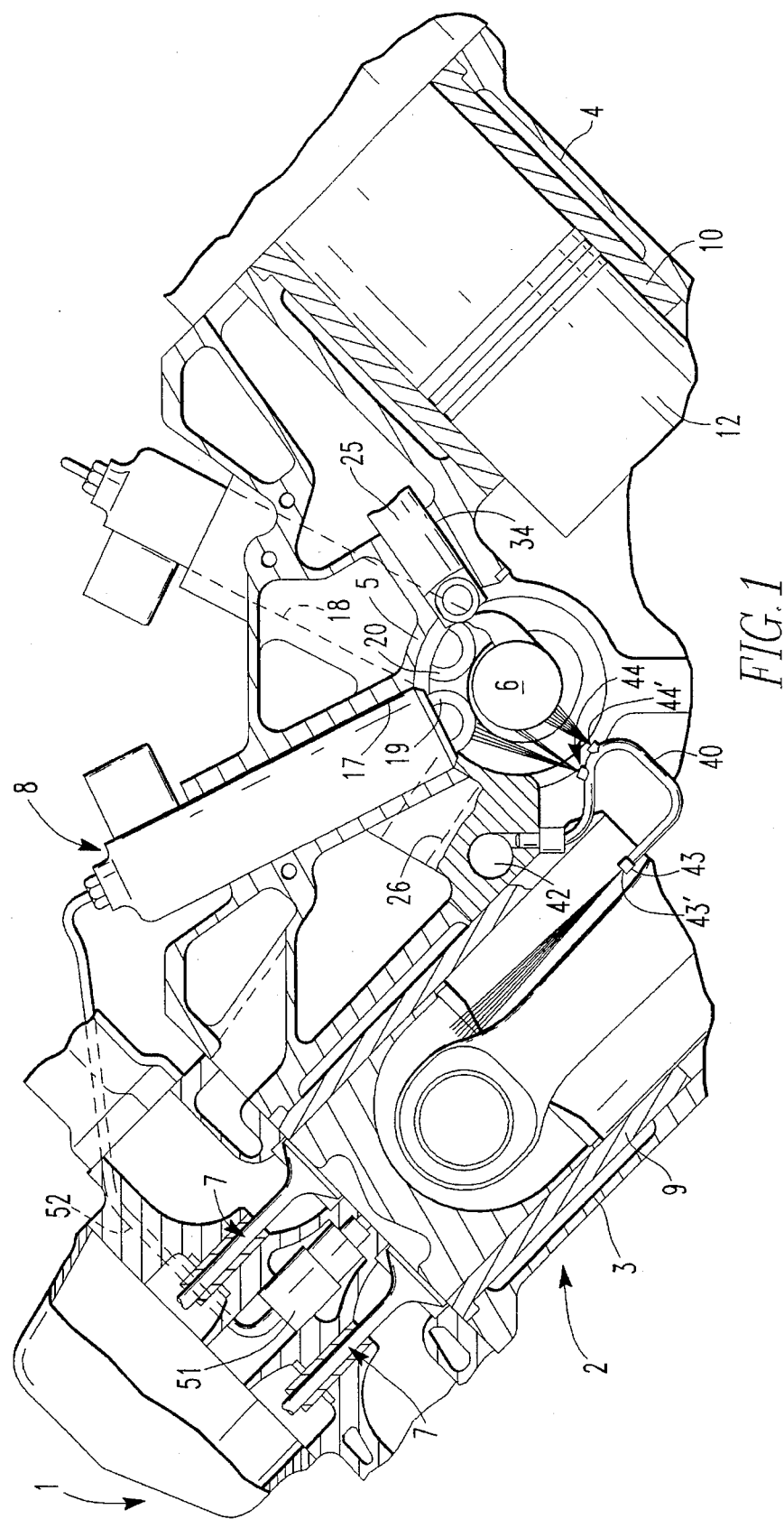
FIG. 1 schematically shows the arrangement according to the invention in an internal combustion engine which is represented in cross-section.

As shown in FIG. 1, a multicylinder internal combustion engine 1 with a cylinder housing 2 has cylinder rows 3, 4 arranged in the shape of a V. A cam shaft receiving portion 5, wherein the bearing for the cam shaft 6 is supported, is located in the cylinder housing 2 in the area of the jointure of rthe cylinder rows. The cam shaft comprises cams for operating the intake and exhaust valves 7 as well as cams for operating all the injection pump elements 8 of both cylinder rows 3, 4. However, as far as the present invention is concerned, the cam shaft may only have cams for operating the intake and exhaust valves or only for operating the injection pump elements 8. At the inner longitudinal sides of the two cylinder rows 3, 4, bores 17, 18 are provided for receiving the injection pump elements 8. Each of these pump elements, so-called pump inserts, of the injection system is operated by the cam shaft against the force of a spring (not shown), via a roller lifter 19 or 20 supported in the bores 17, 18. From the pump insert 8, an injection pipe 52 leads to the corresponding injection nozzle 51.

Push rods 25 are located between the cylinders and the pump inserts 8. The push rod ends are guided in valve lifter guides 26 and 34. The intake and exhaust valves 7 are operated by the cam shaft 6 via the push rods 25.

The arrangement for supplying coolant to the various pistons 11, 12 comprises a pipe 40 (for clarity reasons only, the pipe 40 for the cooling of a piston in the left row of cylinders is shown) which is mounted, with one end, to the cylinder housing 2 and is in flow communication with a coolant supply channel 42 formed in the cylinder housing 2. Starting from its point of mounting to the cylinder housing 2, the pipe 40 extends with one or more bent sections around the lower edge of a cylinder sleeve such that the free end of the pipe 40 is disposed opposite the bottom side of the piston 11. At its free end, the pipe 40 is provided with a jet nozzle 43 for spraying coolant onto the underside of the piston 11. The coolant, such as oil, flows through the pipe 40 and is sprayed from the nozzle 43 onto the underside of the piston 11.

In accordance with the invention, the pipe 40 is provided with at least one additional nozzle opening 44. As is shown in FIG. 1, coolant such as oil is sprayed from this nozzle opening 44 toward the roller lifter 19, that is, to the area of contact between cam shaft 5 and roller lifter 19 of the injection pump element 8. The roller lifters 19 of the injection pump elements 8 are well lubricated thereby.

The nozzle opening 44 may be elongated and so shaped that it will not only lubricate the roller lifter 19, but also the lifter 25 of the intake and exhaust valve drive, that is, the contact areas between the lifter 25 and the cam shaft 5. The nozzle opening 44 may be slot shaped for example.

It is also possible to shape the nozzle opening 44 in such a way that cooling oil emitted therefrom is directed only toward the valve lifters 25.

It is furthermore possible to provide two or more nozzle openings 44 along the pipe 40, that is, a nozzle opening 44' for the lubrication of the intake and exhaust valve drive and a separate nozzle opening 44 for the lubrication of the operating mechanism for the fuel injection pump.

At least the additional nozzle opening 44' may be formed into the otherwise finished pipe 40 by drilling or it may be formed into the pipe 40 during manufacture of the pipe. Preferably, the additional nozzle opening 44' extends normal to the longitudinal axis of the pipe 40. A jet structure 43 with an opening 43' may be attached to the end of the pipe 40 for cooling the underside of the piston. Such jet structures may also be attached to the pipe 40 as well as to the openings 44 and 44'. Alternatively, pipe and nozzle structures may be manufactured integrally as a single structure.

The particular pipes 40 have to be oriented accurately such that the sprays from the nozzles are directed exactly toward the desired components. Adjustment of the orientation must be simple and it should be possible to perform such adjustment with simple means.

Figure 2:
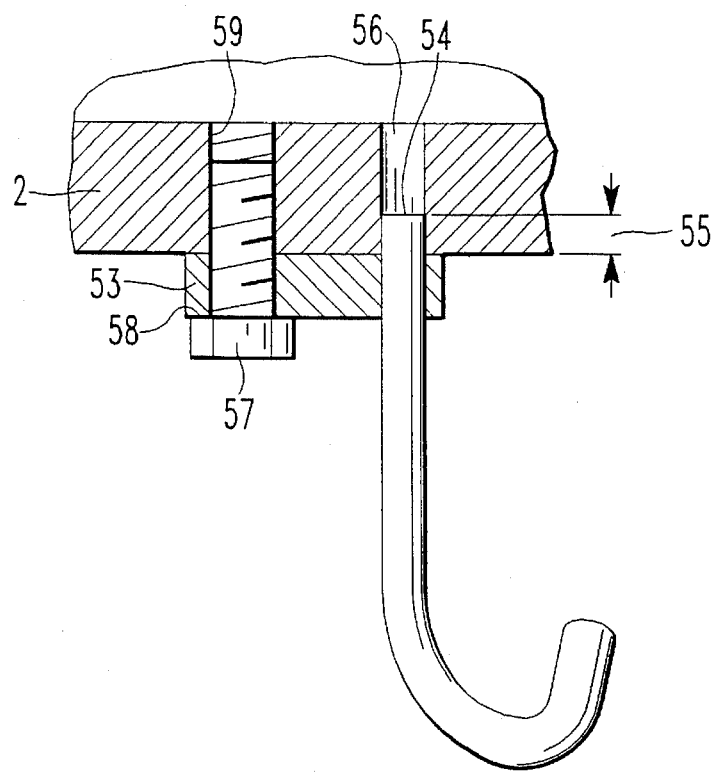
FIG. 2 shows the mounting arrangement for a lubricant supply pipe.
Figure 3:
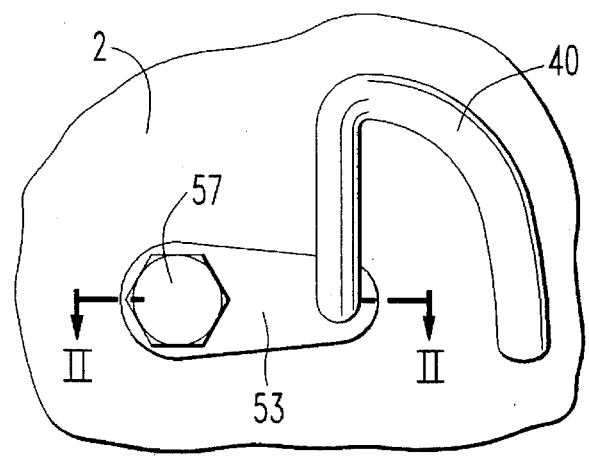
FIG. 3 is a plan view of the mounting arrangement of FIG. 2.

This is achieved as shown in FIGS. 2 and 3 by a locating tab 53 extending from the pipe 40. The pipe 40 extends through the tab 53 and projects into a bore 56 formed in the cylinder housing and extending to the cooling oil or lubricant supply channel 42. The open end 54 of the pipe 40 is received in the bore 56 with a certain engagement length 55, so that it is firmly held in that bore to provide a first support means. Final securing is achieved by means of a screw 57 which extends through a bore 58 in the tab 53 and is screwed into a threaded bore 59 extending into the cylinder housing 2 to provide a second support means.

In order to provide for automatic positioning of the discharge nozzles 43 and 44, the bores 56 and 59 in the cylinder housing 2 and the pipe 40 are arranged in a predetermined position with regard to the tab 53.

What is claimed is:

1. An arrangement for supplying coolant to a piston movable in a cylinder of an internal combustion engine having a cylinder housing with intake and exhaust valve drive and fuel injection pump drive components, said arrangement comprising: a pipe mounted on said cylinder housing so as to be in communication with a coolant supply passage extending through said housing, said pipe extending to the underside of said piston and having at its end a discharge opening for spraying coolant to the underside of said piston and said pipe further having, along its length, at least one additional discharge opening directed toward at least one of said intake and exhaust valve drive components and said fuel injection pump drive components for lubricating said components.

2. An arrangement according to claim 1, wherein two openings are provided for the lubrication of said drive components, one being directed toward the intake and exhaust valve drive components to provide lubrication therefor and the other toward the pump drive components for their lubrication.

3. An arrangement according to claim 1, wherein said at least one additional discharge opening consists of a bore drilled into said pipe.

4. An arrangement according to claim 1, wherein said discharge openings of said pipe are provided with nozzles mounted on said pipe.

5. An arrangement according to claim 1, wherein said pipe has at its discharge openings discharge nozzles integrally formed with said pipe.

6. An arrangement according to claim 1, wherein said pipe is provided with a tab extending therefrom perpendicularly with regard to the pipe axis and said pipe projects beyond said tab and has its projecting end received in a bore leading to a coolant supply passage formed in the cylinder housing and said tab has at its free end an opening receiving a screw screwed into a threaded bore in said housing for firmly mounting said pipe, and orienting it with regard, to said housing.

\* \* \* \* \*